April 19, 1966  R. A. PALMER  3,246,501
TEMPERATURE SENSING DEVICE AND METHOD
OF MAKING THE SAME OR THE LIKE
Filed March 26, 1962  2 Sheets-Sheet 1
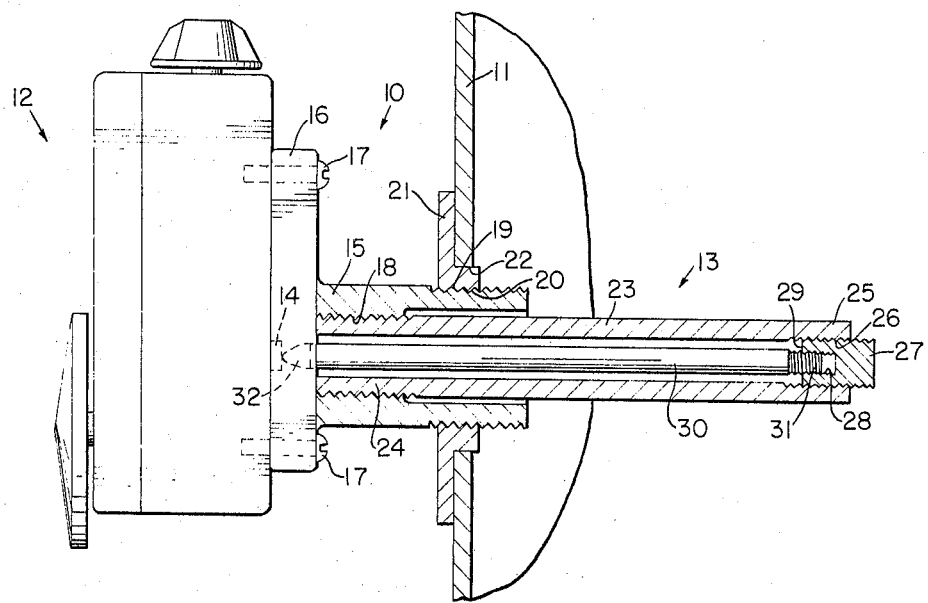
FIG-1-PRIOR ART
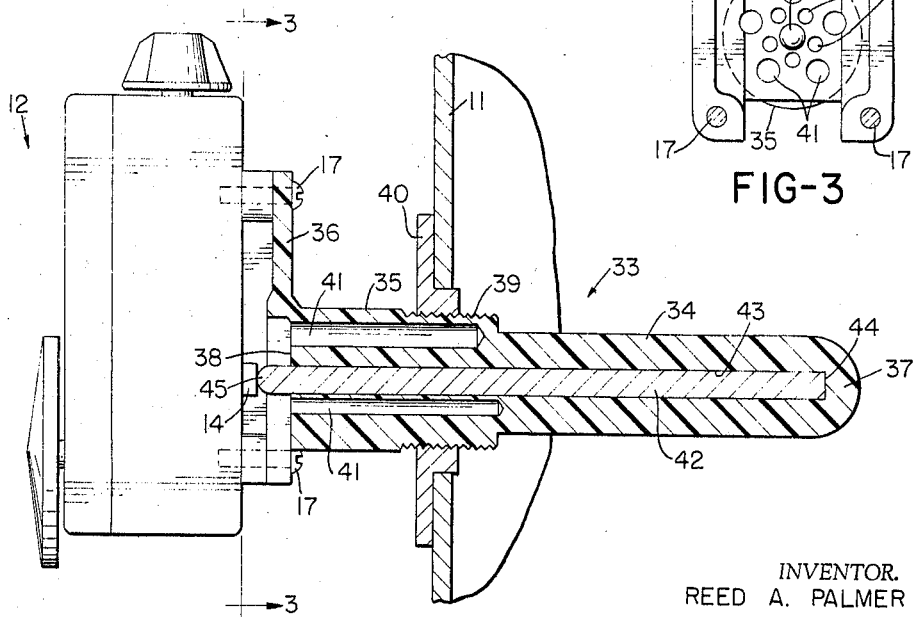
FIG-2
FIG-3
INVENTOR.
REED A. PALMER
BY
Robert R Candor
ATTORNEY April 19, 1966  R. A. PALMER  3,246,501
TEMPERATURE SENSING DEVICE AND METHOD
OF MAKING THE SAME OR THE LIKE
Filed March 26, 1962  2 Sheets-Sheet 2

INVENTOR.
REED A. PALMER
BY Robert R. Candor
ATTORNEY

United States Patent Office 3,246,501
Patented Apr. 19, 1966

3,246,501
TEMPERATURE SENSING DEVICE AND METHOD
OF MAKING THE SAME OR THE LIKE
Reed Albert Palmer, Los Alamitos, Calif., assignor to Robertshaw Controls Company, Richmond, Va., a corporation of Delaware
Filed Mar. 26, 1962, Ser. No. 182,482
15 Claims. (Cl. 73—362.3)

This invention relates to an improved temperature sensing device as well as to an improved method of making and utilizing such a device or the like.

Heretofore, a conventional type of temperature sensing device which is utilized to sense the temperature in an enclosed area and actuate various structures in response to the temperature variations in that area comprises a conventional tube and rod arrangement.

In particular, the tube is normally formed from a metal or metallic material, such as copper or the like, having a relatively high coefficient of thermal expansion as well as a relatively high coefficient of thermal conductivity, the tube having one end thereof closed by a suitable threaded member or plug and carrying a metallic rod therein. The rod has one end engaging or being secured to the closed end of the tube and has the other end thereof projecting out through the other opened end of the tube.

The rod is normally made from a metal or metallic material, such as invar, having a relatively low coefficient of thermal expansion in relation to the material of the tube.

The open end of the tube is normally interconnected to a shank portion which is adapted to be respectively secured to the wall of the enclosed area and to a control device disposed outside of the enclosed area whereby relative movement of the free end of the rod actuates various structure in the control device in response to the temperature changes in the enclosed area acting on the sensing portion of the tube and rod arrangement.

For example, one such use for the above mentioned tube and rod sensing device is in a water heater system wherein the tube and rod arrangement projects into the interior of the water tank and actuates valve means carried by a control device disposed exteriorly of the water tank, the valve means being adapted to interconnect a source of fuel with a burner utilized to heat the water in the tank.

Assuming that the water in the water tank is at the selected temperature, the free end of the rod of the temperature sensing device is so disposed that the valve means of the control device is in a closed position thereof to prevent fuel from flowing to the main burner of the system.

However, should a draw of hot water be made on the water tank, the amount of hot water drawn therefrom is replaced by suitable valving arrangement which permits unheated water to enter the water tank in the region of the temperature sensing device.

Since the added cold water surrounds the tube of the temperature sensing device, the copper tube tends to contract whereby the free end of the rod is moved toward the control device and causes the valve means of the control device to open to supply fuel to the burner to heat the water in the tank to the selected temperature. When the water in the tank has reached the selected temperature, the tube of the temperature sensing device has expanded to such an extent that the free end of the rod moves away from the control device and permits the valve means of the control device to close to terminate operation of the main burner.

However, it has been found that such a prior known temperature sensing device has a time lag in the operation thereof because the metal tube has a relatively high coefficient of thermal conductivity.

For example, in the above operation of the water heater system, the inrush of cold water into the water tank not only tends to contract the copper tube thereof, but, because the copper tube is a good thermal conductor, the rod associated therewith is also cooled almost simultaneously with the cooling of the copper tube whereby the rod itself contracts to tend to move away from the control device while the cooled copper tube is tending to move the rod toward the control device.

Therefore, the prior known temperature sensing device does not immediately cause the control device to operate the water heater burner when cold water enters the water tank because of the simultaneous contraction of the rod with the contraction of the tube.

This invention overcomes the above disadvantage by forming the sensing tube of the above type of temperature sensing device of a material that has a relatively high coefficient of thermal expansion and a relatively low coefficient of thermal conductivity.

Thus, in the above operation of the temperature sensing device of this invention, the inrush of cold water is immediately sensed by the tube while the rod remains in its heated condition and will not tend to contract while the tube is contracting so that the rod immediately activates the control device to cause the main burner to operate.

In this manner, the temperature sensing device of this invention produces an "anticipating effect" which results in excellent, low differential operation of a water heater or the like.

In the past, an attempt was made to prevent such time lag in the conventional tube and rod arrangement by making the rod of a material which has a relatively low coefficient of thermal expansion. For example, a relatively expensive invar rod was utilized.

However, because of the thermal insulating characteristic of the material of the tube of this invention, together with its high coefficient of thermal expansion, the rod utilized in combination therewith can be a stainless steel rod which costs approximately one-third as much as a similar invar rod whereby the cost of the temperature sensing device of this invention is less than prior known devices and operates in a more efficient manner.

One material for forming the sensing tube of this invention which has a relatively high coefficient of thermal expansion and a relatively low coefficient of thermal conductivity is acetal resin.

When such acetal resin is utilized, it has been found that the same has an extremely low coefficient of friction.

This low coefficient of friction of the acetal resin permits the rod of the temperature sensing device to be snugly received within the axial bore of the acetal resin tube member. Such snug fit provides lateral support for the rod and eliminates, to a substantial degree, undesirable "column action" which tends to make the spring rate of the rod non-linear. This feature of the temperature sensing device of this invention improves the linearity of calibration thereof and provides for consistent clicker operation of the valve means of the control device associated therewith.

Further, the linearity of the spring rate of the rod element of this invention is further assured by the fact that the temperature sensing device of this invention can effect a desired differential when the same is relatively short in comparison to the length of a prior known temperature sensing device that effects the same differential. For example, when the temperature sensing device of this invention is approximately three inches in length, the same effects the same differential as a prior known device having a length of approximately one foot.

Thus, the relatively short rod of the temperature sensing device of this invention is subject to very little "column action" and has a linear spring rate. Therefore, the short sensing device of this invention permits the use of a low differential thermostat in a water heater having a center flue, a combination of heater and control heretofore impossible.

Since the prior known temperature sensing device had the copper tube thereof interconnected to a brass shank, casting of the tubular portion of the temperature sensing device in one piece was impossible. Further, even if such a casting were made, the cross section of the sensing portion of the tube would have to be substantially greater than the cross section of the copper tube in order to provide sufficient tensile strength and be impervious to leakage.

Such a brass or copper casting would have a spring rate so high it would be incapable of operating a snap action mechanism. In this regard, the industry has found it necessary to go to a copper tube to produce the necessary strength and imperviousness whereby considerable expense to machine the casting and tubing for the assembly is encountered.

Such disadvantages are completely eliminated by utilizing acetal resin in the manner hereinafter described to produce a one piece assembly by a simple casting operation or the like whereby production costs are held to a minimum.

Because the acetal resin which forms the tubular portion of the temperature sensing device of this invention has high dielectric properties, the gas pipe which is connected to the control device of the water heater is insulated from the water tank and water connections thereto. This reduces the possibility of electrolytic corrosion as the result of current carried through the gas piping.

In one embodiment of this invention, the only portion of the sensing element which is exposed to the water within the water tank is composed of an electrical insulator which prevents the sensing element from setting up galvanic action or conducting current which may cause electrolytic corrosion within the water tank.

In this regard, it is important to note that all water heater thermostats of the above type that are now on the market are provided with a vinyl tubing which is slipped over the copper tube of the sensing element to cut down the area exposed to water within the tank. While such vinyl tubing is effective to reduce the exposed copper area, the same does not eliminate the possibility of galvanic or electrolytic corrosion since the brass of the shank of the temperature sensing device and the end of the copper tube thereof are exposed to water within the tank.

Another advantage of one of the temperature sensing devices of this invention is that the threaded joint between the sensing element and the brass shank of the prior known temperature sensing device is eliminated by the temperature sensing device of this invention to eliminate a source of possible leakage. In addition, the normal threaded connection between the end of the tube and the screw machine part which is threaded into the same is eliminated to eliminate another possible source of leakage.

Since the flange portion of the shank of one of the embodiments of the temperature sensing device of this invention is also an electric insulator by being formed from the aforementioned acetal resin, another source of galvanic corrosion is eliminated where this flange is secured to the aluminum body of the control device.

Since the acetal resin forming the tube portion of the temperature sensing device of this invention has a relatively low coefficient of thermal conductivity, the flow of heat from the hot water in the tank through the temperature sensing device to the control device is reduced to almost zero. This permits the control device to operate at lower temperatures, thereby extending the life of the rubber and other perishable components within the control device. Such heat insulating properties of the acetal resin also keeps the magnetic current within the control device at lower temperatures to keep the resistance of such circuits down and simplify its operation with the low electrical power available from the thermocouple.

Accordingly, it is an object of this invention to provide an improved temperature sensing device having one or more of the novel features set forth above or hereinafter shown or described.

Another object of this invention is to provide an improved method of making and utilizing such a temperature sensing device.

Other objects, uses and advantages of this invention are apparent from a reading of this description which proceeds with reference to the accompanying drawing forming a part thereof and wherein:

FIGURE 1 is a fragmentary, schematic, partial cross sectional view illustrating one application of a prior known temperature sensing device.

FIGURE 2 is a view similar to FIGURE 1 illustrating the improved temperature sensing device of this invention.

FIGURE 3 is an end view of the temperature sensing device illustrated in FIGURE 2 and is taken on line 3—3 thereof.

Figure 4:
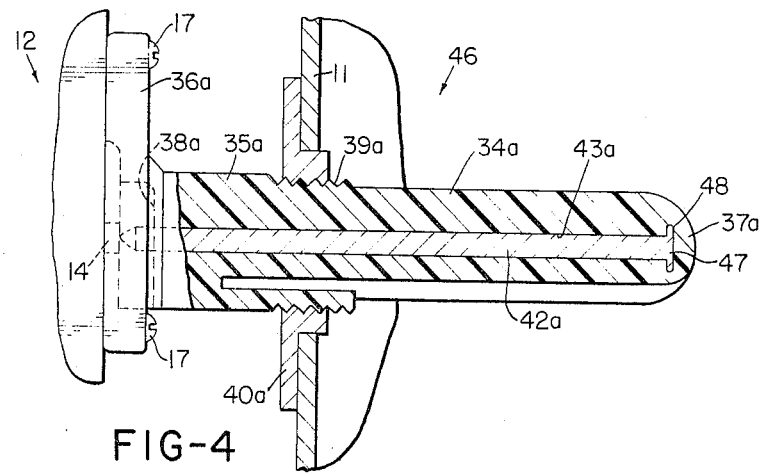
FIGURE 4 is a view similar to FIGURE 2 illustrating another embodiment of this invention.

While the various features of this invention are hereinafter described and illustrated as being particularly adaptable for use in a water heater control system, it is to be understood that the various features of this invention can be utilized singly or in any combination thereof to provide other systems as desired.

Therefore, this invention is not to be limited to only the embodiments thereof illustrated in the drawings, because the drawings are merely utilized to illustrate one of the wide variety of uses of this invention.

Referring now to FIGURE 1, one system for utilizing a prior known sensing device of the aforementioned tube and rod arrangement is generally indicated by the reference numeral 10 and comprises a water tank 11 adapted to have the water therein heated by a conventional burner (not shown) that is fed fuel from a conventional control device 12 upon the sensing operation of a prior known sensing device 13 projecting into the water tank 11 and being interconnected to the control device 12.

In particular, the control device 12 includes a valve means which is adapted to control the flow of fuel to the main burner of the water tank 11. Such valve means is normally moved to an open position when a plunger 14 has been moved to the left a sufficient distance to cause a snap action member to snap over dead center and open the valve means a predetermined amount. Further movement of the plunger 14 to the left causes the valve member to further open in a throttling manner. Conversely, movement of the plunger 14 to the right permits the valve means to close in a throttling manner whereby the flow of fuel to the main burner of the water tank 11 is controlled by such valve means.

The prior known temperature sensing device 13 comprises a brass shank member 15 having a mounting flange 16 adapted to be secured to the rear of the control device 12 by a plurality of bolts 17, the brass shank 15 having an internally threaded bore 18 and an externally threaded portion 19 adapted to be threadedly received in a threaded bore 20 of a retainer or nipple 21 secured in any suitable manner to the tank wall 11 and projected through an aperture 22 thereof.

A copper tube 23 of the prior known temperature sensing device 13 has an externally threaded open end 24 threadedly received in the threaded bore 18 of the brass shank 15 to hold the end 24 of the copper tube 23 fixed relative to the control device 12. The other open end 25 of the copper tube 23 is internally threaded at 26 to receive a threaded plug member 27 having a threaded bore 28 interrupting one end 29 thereof. An invar rod 30 of the temperature sensing device 13 has a threaded end 31 received in the threaded bore 28 of the plug 27 to interconnect the end 31 of the rod 30 to the free end 25 of the copper tube 23.

The free end 32 of the rod 30 is disposed in such a position that the same is adapted to contact the plunger or button 14 of the control device 12 to operate the valve means therein upon movement of the end 32 of the rod 30 relative to the control device 12.

In particular, when the tube 23 of the temperature sensing device 13 senses a drop in temperature in the water tank 11 below a selected temperature, the tube 23 contracts and, thereby, moves the end 32 of the rod 30 to the left to cause the plunger 14 to open the valve means of the control device 12. Conversely, upon an increase of temperature in the water tank 11, the copper tube 23 expands and moves the end of the rod 32 to the right to permit the valve means in the control device to move toward its closed position.

As previously set forth, the prior known temperature sensing device 13 has certain disadvantages which are eliminated by the various temperature sensing devices of this invention.

In particular, assume that the water in the tank 11 of FIGURE 1 is heated to the desired temperature thereof whereby the tube 23 and rod 30 are respectively heated to that temperature and are expanded to the position illustrated in FIGURE 1 to cause the valve means of the control device 12 to be disposed in its closed position.

Upon a subsequent draw of hot water from the water tank 11 and an inflow of cold water thereto in the region of the thermostat device 13, the tube 23 and rod 30 are almost simultaneously cooled by the inrush of cold water because the copper tube 23 has a relatively high coefficient of thermal conductivity.

Therefore, not only does the tube 23 tend to contract to move the end 32 of the rod 30 toward the control device 12 to open the valve means thereof, but the rod 30 also tends to contract to move the end 32 of the rod away from the control device 12 whereby a time lag is effected in the opening of the valve means of the control device 12 because of the subsequent contraction of the rod 30 thereof.

However, in the temperature sensing device of this invention, the tube portion of the temperature sensing device is formed of a material having a relatively low coefficient of thermal conductivity whereby the rod thereof would not be subsequently cooled at the same time that the tube was being cooled by the inrush of cold water so that an immediate reaction takes place in the control device upon an inrush of cool water into the water tank to operate the main burner thereof.

In particular, reference is made to FIGURE 2 wherein the improved temperature sensing device of this invention is generally indicated by the reference numeral 33 and comprises a sensing tube portion 34 formed integrally with a shank portion 35 and a mounting flange 36, the sensing tubular portion 34, shank 35 and flange 36 being formed of the same material which has a relatively high coefficient of thermal expansion and a relatively low coefficient of thermal conductivity as well as high dielectric properties.

For example, the tube 34 of this invention can be formed by suitably molding acetal resin or the like.

In particular, one type of acetal resin which has been found satisfactory in Delrin manufactured by the Du Pont de Nemours Company, Incorporated.

Another type of acetal resin which has been found satisfactory is Celcon manufactured by the Celanese Corporation.

The assembly 34, 35 and 36 is so formed that tube 34 has a molded closed end 37 and an open end 38 disposed adjacent the mounted flange 36.

The shank portion 35 of the sensing tube 34 is externally threaded at 39 to be threadedly received in the nipple or plug 40 secured to the wall 11 of the water tank or the like.

It has been found desirable to interrupt the end 38 of the tube 34 with a plurality of coaxially aligned bores 41 extending inboard from the threaded portion 39 thereof to prevent or minimize any longitudinal extrusion of the entire assembly 34, 35 and 36 when it is firmly threaded into the tapered pipe threads of the nipple 40. It was found that this extrusion characteristic altered the calibration of the assembly so that by removing some of the material, by the bores 41, the shank portion 35 is afforded flexibility in the direction normal to the temperature sensing movement of the assembly.

A rod 42 is disposed in the longitudinal bore 43 of the tubular member 34 and has a flat end 44 engaging the closed end 37 of the tubular member 34, the rod 42 having a free end 45 projecting outwardly from the open end 38 of the tubular member 34 to engage the button 14 of the control device 12 in the above manner.

Because the acetal resin forming the assembly 34, 35, and 36 has a relatively high coefficient of thermal expansion, the free end of the rod 45 is moved relative to the control device 12 upon expansion or contraction of the tubular member 34.

Further, because the acetal resin forming the assembly 34, 35, and 36 has a relatively low coefficient of thermal conductivity, subsequent cooling of the tube 34 by an inrush of cold water around the same, does not result in a subsequent cooling and contraction of the rod 42 whereby contraction of the tubular portion 34 causes an immediate response in the control device 12 to heat the water in the tank 11.

In this manner the rod 42 of this invention need not be formed of an expensive material having a low coefficient of thermal expansion because of the low coefficient of thermal conductivity of the material forming the remainder of the temperature sensing device 33. For example, a stainless steel rod 42 can be utilized with this invention instead of the more expensive invar rods of the prior known devices.

Since the acetal resin forming the assembly 34, 35, and 36 has a relatively low coefficient of friction, the rod 42 can be snugly disposed in the bore 43 of the tubular member 34 whereby the tubular member provides lateral support for the rod and eliminates, to a substantial degree, undesirable "column action" which would tend to make the spring rate of the rod 42 non-linear. This improves the linearity of calibration of the device 33 and provides for consistent valve means operation in the control device 12.

Further, the linearity of the spring rate of the rod 42 of this invention is further assured by the fact that with the temperature sensing device 33 of this invention, the temperature sensing device 33 can effect a differential with a sensing element on the order of three inches in length which is the same differential previously produced with the sensing element 23 illustrated in FIGURE 1 of approximately one foot in length.

Therefore, it can be seen that by utilizing a short rod 42 in the temperature sensing device 33 of this invention, the rod 42 is subject to very little "column action" and has a linear spring rate.

In addition, the short temperature sensing device 33 of this invention permits the use of a low differential thermostat in a water heater having a center flue, a combination of heater and control heretofore impossible when utilizing the temperature sensing means 13 of FIGURE 1.

When forming the temperature sensing element 13 of FIGURE 1, it can be seen that the shank 15, tube 23 and end closure 27 must be separately formed and machined to provide the assembly whereas in applicant's device the entire assembly 34, 35, and 36 can be molded as an integral unit in a single production operation whereby the temperature sensing device 33 of this invention is relatively inexpensive in comparison to the temperature sensing device 13 of FIGURE 1.

In addition, since the acetal resin forming the assembly 34, 35, and 36 of the temperature sensing device 33 of this invention has good dielectric properties, the control device 12 is insulated from the water tank 11 and water connections thereto whereby the possibilities of electrolytic corrosion as the result of current carried through the gas pipe connected to the control device 12 is eliminated.

The dielectric properties of the acetal resin forming the assembly 34, 35, and 36 also prevent the sensing element 34 from setting up galvanic action or conducting current which may cause electrolytic corrosion within the tank 11.

Since the assembly 34, 35 and 36 is formed as a one piece construction, it can be seen that sources of leakage are eliminated therein which may be present in the threaded connections between the members 27, 23, and 15 of the prior known temperature sensing device 13 of FIGURE 1.

Further, since the flange portion 36 of the temperature sensing device 33 of this invention is formed of dielectric material, another source of galvanic corrosion is eliminated where this flange 36 is secured to the aluminum body of the control device 12.

As previously set forth, the acetal resin forming the assembly 34, 35, and 36 has a relatively low coefficient of thermal conductivity whereby the flow of heat from the hot water in the tank 11 through the shank portion 35 of the temperature sensing device 33 of this invention to the control body 12 is reduced to almost zero. This permits the control device 12 to operate at lower temperatures, thereby extending the life of the rubber and other perishable components within the control device 12.

Further, the heat insulating properties of the assembly 34, 35, and 36 keep the magnetic circuit within the control device 12 at a lower temperature to keep the resistance of the circuit down and simplify its operation with the low electrical power available from the thermocouple.

It has been found that when the assembly 34, 35, and 36 is formed of the aforementioned Delrin acetal resin, the hot water in the tank 11 tends to attack the Delrin.

Accordingly, the immersed portion of the assembly 34, 35, and 36 can be provided with a waterproofed coating, such as with a vinyl coating and the like, to prevent such water attack.

However, when the aforementioned Celcon acetal resin is utilized, it has been found that the same is relatively resistant to attack by water whereby such waterproofing need not be utilized.

Another temperature sensing device of this invention is generally indicated by the reference numeral 46 in FIGURE 4 wherein parts thereof similar to the temperature sensing device 33 illustrated in FIGURE 2 are indicated by like reference numerals followed by the reference letter "a".

As illustrated in FIGURE 4, the temperature sensing tubular portion 34a, shank portion 35a and mounting flange 36a are formed as an integral unit from the aforementioned acetal resin and has a longitudinal bore 43a interrupting the opened end 38a thereof and terminating short of the closed end 37a thereof.

The rod 42a disposed in the bore 43a of the temperature sensing portion 34a has an enlarged end 47 disposed in an annular recess 48 formed in the tubular member 34a to positively hold the end 47 of the rod 42a relative to the free end 37a of the temperature sensing tubular portion 34a.

While the rod 42a and temperature sensing device 34a can be formed in any suitable manner, one such method of making the same would be to mold the acetal resin directly around the rod 42a to form the assembly illustrated in FIGURE 4.

Figure 5:
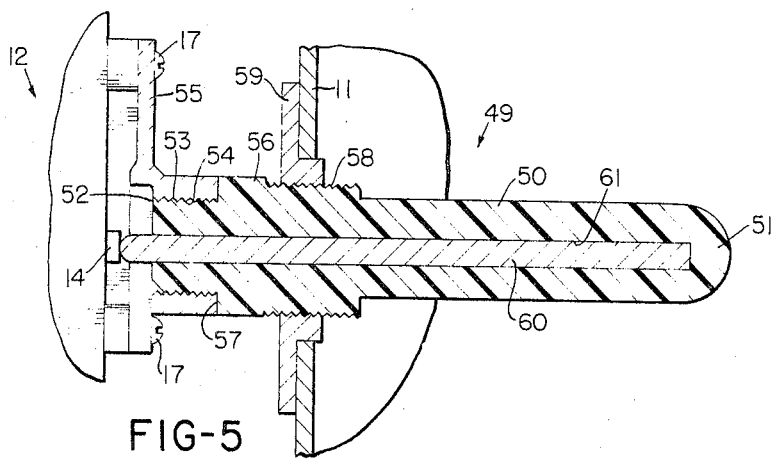
FIGURE 5 is a view similar to FIGURE 2 and illustrates another embodiment of this invention.

If it is desired to adapt the principles of the acetal resin of this invention to existing control devices 12, the temperature sensing device of this invention can be formed in the manner illustrated in FIGURE 5 and generally indicated by the reference numeral 49.

In particular, the temperature sensing device 49 comprises a tubular portion 50 having closed end 51 and an opened end 52, the opened end 52 being externally threaded at 53 to be telescopically received in a threaded bore 54 of a conventional flange member 55 of a conventional control device 12.

The tubular member 50 has an outwardly extending annular portion 56 defining a shoulder 57 to sealably abut the flange 55, the annular portion 56 being externally threaded at 58 to be threadedly received in the nipple 59 carried by the wall 11 of the water tank or the like.

The rod 60 is disposed in the bore 61 formed in the tubular member 50 and operates in the same manner as the rods 42 and 42a previously described.

Figure 6:
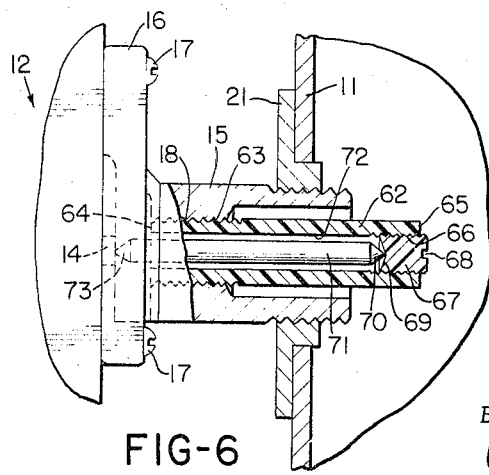
FIGURE 6 is a view similar to FIGURE 2 and illustrates still another embodiment of this invention.

In addition, the various features of this invention can be incorporated into the conventional mounting flange 16 and shank portion 15 of the control device 12 illustrated in FIGURE 1 in the manner illustrated in FIGURE 6.

In particular, the control device 12, as illustrated in FIGURE 6, is interconnected to the mounting flange 16 by bolts 17 and has the shank portion 15 thereof threadedly received in the threaded nipple 21 secured to the wall 11 of the water heater tank or the like.

A tubular member 62, formed of acetal resin or the like, has an externally threaded portion 63 adapted to be telescopically and threadedly received in the threaded bore 18 of the shank 15 whereby the end 64 of the tubular member 62 is fixed relative to the control device 12.

The other end 65 of the tubular member 62 is internally threaded at 66 to threadedly receive an externally threaded plug member 67 formed of acetal resin or the like, the plug member 67 having bifurcated end 68 to adjust the position of the plug 67 relative to the tubular member 62.

The other end 69 of the plug member 67 is dished inwardly to receive a rounded end 70 of a rod 71 disposed in the bore 72 of the tubular member 62, the rod 71 having a free end 73 which functions in the same manner as the rods 42, 42a, and 60 previously described.

Therefore, it can be seen that various improved temperature sensing devices have been provided by this invention wherein the same utilize the principle of having a tubular member formed of a material having a relatively high coefficient of thermal expansion and a relatively low coefficient of thermal conductivity to permit the rod disposed therein to be unaffected by rapid temperature changes sensed by the tubular portions of the temperature sensing devices.

Further, the material forming the tubular members of the temperature sensing devices of this invention have high dielectric properties whereby adverse galvanic and electrolytic actions are eliminated.

While the form of the invention now preferred has been disclosed as required by the statutes, other forms may be used, all coming within the scope of the claims which follow.

What is claimed is:

1. A temperature sensing device comprising a rigid plastic tube having one closed end thereof, and a metal rod snugly disposed in said tube and having one end thereof engaging the closed end of said tube and the other end thereof extending in the same direction as the other end of said tube whereby said tube provides lateral support for said rod and tends to eliminate column action of said rod so that the spring rate of said rod is linear, said tube being formed of a material that has a relatively high coefficient of thermal expansion, a relatively low coefficient of thermal conductivity and a relatively low coefficient of friction when compared to metal.

2. A temperature sensing device as set forth in claim 1 wherein said tube has high dielectric properties.

3. A temperature sensing device as set forth in claim 1 wherein said tube is formed of acetal resin.

4. A temperature sensing device as set forth in claim 1 wherein said one end of said rod is flat.

5. A temperature sensing device as set forth in claim 1 wherein said rod is stainless steel.

6. A temperature sensing device comprising a rigid plastic tube having one closed end thereof and an opposed open end thereof adapted to be secured to a control device, and a metal rod snugly disposed in said tube and having one end thereof engaging the closed end of said tube and the other end thereof extending in the same direction as said open end of said tube whereby said tube provides lateral support for said rod and tends to eliminate column action of said rod so that the spring rate of said rod is linear, said tube being formed of a material that has a relatively high coefficient of thermal expansion, a relatively low coefficient of thermal conductivity and a relatively low coefficient of friction when compared to metal.

7. A temperature sensing device as set forth in claim 6 wherein said tube is formed of acetal resin.

8. A temperature sensing device as set forth in claim 6 wherein said tube has a plurality of bores interrupting the open end thereof.

9. A temperature sensing device as set forth in claim 6 wherein said tube has at least a portion thereof externally threaded for attachment to a water heater or the like.

10. In combination, a wall enclosing an area, a control device disposed outside said area, and a temperature sensing device secured to said control device and projecting through said wall into said area, said temperature sensing device including a rigid plastic tube having a closed end disposed in said area and a metal rod snugly disposed in said tube whereby said tube provides lateral support for said rod and tends to eliminate column action of said rod so that the spring rate of said rod is linear, said rod having one end thereof engaging said closed end of said tube and having the other end thereof extending toward said control device, said tube being formed of a material that has a relatively high coefficient of thermal expansion, a relatively low coefficient of thermal conductivity and a relatively low coefficient of friction when compared to metal.

11. A combination as set forth in claim 10 wherein said tube has high dielectric properties.

12. A combination as set forth in claim 10 wherein said tube is formed of acetal resin.

13. In combination, a wall enclosing an area, a control device disposed outside said area, and a temperature sensing device secured to said control device and projecting through said wall into said area, said temperature sensing device including a rigid plastic tube having a closed end disposed in said area and a metal rod snugly disposed in said tube whereby said tube provides lateral support for said rod and tends to eliminate column action of said rod so that the spring rate of said rod is linear, said rod having one end thereof engaging said closed end of said tube and having the other end thereof extending toward said control device, said tube being secured to said control device at the other end of said tube and being secured to said wall intermediate the ends of said tube, said tube being formed of a material that has a relatively high coefficient of thermal expansion, a relatively low coefficient of thermal conductivity and a relatively low coefficient of friction when compared to metal.

14. A combination as set forth in claim 13 wherein said tube is formed of acetal resin.

15. A temperature sensing device comprising a tube having one closed end thereof, and a rod snugly disposed in said tube and having one end thereof engaging the closed end of said tube and the other end thereof extending in the same direction as the other end of said tube whereby said tube provides lateral support for said rod and tends to eliminate column action of said rod so that the spring rate of said rod is linear, said tube being formed of a material that has a relatively high coefficient of thermal expansion, a relatively low coefficient of friction when compared to metal, said one end of said rod being enlarged and said tube being molded around said rod so that said enlarged end of said rod is secured to said closed end of said tube.

References Cited by the Examiner

UNITED STATES PATENTS

| 1,060,136 | 4/1913 | Schneider | 73—362.3 X |
| 1,786,852 | 12/1930 | Kenny | 73—362.3 X |
| 2,548,941 | 4/1951 | Brown. | |

FOREIGN PATENTS

| 715,922 | 9/1954 | Great Britain. |

OTHER REFERENCES

Du Pont Fact Sheet on Delrin, received at Patent Office Nov. 15, 1956.

Lange, Handbook of Chemistry, 10th Ed., N.Y., McGraw-Hill Book Co., Inc., 1961, page 850 TP 151, H25, 1961.

LOUIS R. PRINCE, *Primary Examiner.*

ISAAC LISANN, *Examiner.*